UNITED STATES PATENT OFFICE.

JOSEPHINE A. HERBEIN, OF SEATTLE, WASHINGTON.

ARTIFICIAL FUEL AND PROCESS OF MAKING THE SAME.

No. 849,068.   Specification of Letters Patent.   Patented April 2, 1907.

Application filed December 8, 1905. Serial No. 291,003.

*To all whom it may concern:*

Be it known that I, JOSEPHINE A. HERBEIN, a citizen of the United States, residing at Seattle, in the county of King and State of Washington, have invented certain new and useful Improvements in Artificial Fuel and Processes of Making the Same, of which the following is a specification.

The object of this invention is the production of an artificial fuel having a high degree of heating efficiency and which can be compounded at a moderate cost and in large quantities to furnish a new article of manufacture and commerce and one which is distinguished by an almost total absence of smoke and ash residue.

My invention consists in the novel employment and combination of various substances and in their conversion into a fuel by an economical process.

In carrying out my invention I first heat petroleum in a vessel and then add resin to be dissolved therein, then reduce the temperature of this mixture, whereupon alkali dissolved in water is added and thoroughly mixed with the aforesaid ingredients, and then boil the mixture until a partial saponification ensues. This material is further saponified by adding dried peat at such a high temperature, affecting the mass through the vegetable acid present in the peat to a violent ebullition, which is continued until the peat has become charged with the compound. The relative quantities of these several ingredients will be proportioned to their respective qualities and also to the desired character of the product. For example, a good grade of fuel contains thirty per cent. of crude petroleum, one per cent. of lime or its equivalent, one per cent. of resin or fatty acid, ten per cent. of coal-dust or its equivalent, and fifty-eight per cent. of dried peat.

While the above-stated formula produces an exceptionally good fuel, having high value in thermal units, good commercial fuel may be made of the aforesaid substances without the coal-dust, yet this contributes materially to improvement in the combustibility and heating qualities of the product. To mold into briquets, the said compound is admixed with celluloses, saccharoses, or glucoses of the carbohydrate group and water in the form of vapor or liquid. The product is then compressed in heated or cold molds to form briquets, which may be further hardened by being subjected to the action of heat, which fuses their exposed surfaces or case-hardens them, and they may be made waterproof by being immersed in or sprayed with a liquefied pitch.

What I claim as new, and desire to secure by Letters Patent, is—

1. The process of making artificial fuel, which consists, first, in heating petroleum, second dissolving resin therein, third, adding an alkali in a watery solution, fourth, boiling the aforesaid mixture until partial saponification is produced, fifth, adding dried peat, sixth, adding saccharoses and lime to produce an impure saccharate of lime, seventh, pressing the mass into briquets, and eighth, subjecting the briquets to the action of heat.

2. The process of making artificial fuel, which consists, first, in heating petroleum, second, dissolving resin in the heated petroleum, third, adding an alkali in a watery solution, fourth, boiling this mixture until partial saponification occurs, fifth, charging dried peat with the partially-saponified petroleum, sixth, adding a lignaceous material, seventh, adding lime and water, eighth, adding dextrin and sugar to form with the previously-supplied lime impure saccharate of lime, ninth, pressing the mass into briquets, and, tenth, subjecting the briquets to the action of heat.

3. The process of making artificial fuel, which consists, first in heating oil, second, dissolving resin in the hot oil, third, adding an alkali, fourth, adding dried peat, fifth, adding lime, sixth, adding water, seventh, adding saccharine material to form with the previously-supplied lime an impure saccharate of lime when the mass is subjected to heat and pressure.

4. An artificial fuel consisting of petroleum, and resin, the addition to this mixture of an alkali and water which under the action of heat effects a partial saponification, dried peat, then by the addition of lime with water and carbohydrates when subjected to pressure accompanied by heat in forming the mass into briquets transforms the last-named ingredients into an impure saccharate of lime to serve as a binder.

5. An artificial fuel consisting of petroleum, and resin, the addition to the mixture of an alkali and water, dried peat, lime and a dextrin, which being subjected to pressure and heat in manufacturing the mass into briquets, transforms the last-named ingredients, with the impurity of saccharine material present in said dextrin, into an impure saccharate of lime for a binder.

In testimony whereof I affix my signature in presence of two witnesses.

JOSEPHINE A. HERBEIN.

Witnesses:
PIERRE BARNES,
D. H. KIRK.